United States Patent [19]

French et al.

[11] 4,274,466
[45] * Jun. 23, 1981

[54] TIRE AND WHEEL RIM ASSEMBLIES

[75] Inventors: Tom French, Sutton Coldfield; William E. Mitchell, Coventry; Michael J. Kenney; Thomas Holmes, both of Sutton Coldfield, all of England

[73] Assignee: Dunlop Limited, London, England

[*] Notice: The portion of the term of this patent subsequent to Apr. 10, 1996, has been disclaimed.

[21] Appl. No.: 962,096

[22] Filed: Nov. 20, 1978

Related U.S. Application Data

[63] Continuation of Ser. No. 801,319, Dec. 5, 1977, Pat. No. 4,148,348.

[30] Foreign Application Priority Data

| Jun. 4, 1976 | [GB] | United Kingdom | 23099/76 |
| Sep. 24, 1976 | [GB] | United Kingdom | 39670/76 |
| Sep. 24, 1976 | [GB] | United Kingdom | 39672/76 |
| Mar. 1, 1977 | [GB] | United Kingdom | 08501/77 |
| Mar. 4, 1977 | [GB] | United Kingdom | 09161/77 |

[51] Int. Cl.³ .............................................. B60C 7/24
[52] U.S. Cl. ............................... 152/381.3; 152/379.3
[58] Field of Search ................ 152/375, 378 R, 379.1, 152/379.2, 381.1, 381.2 R, 385, 330 RF, 379.3, 381.3, 381.4; 301/95–98

[56] References Cited

U.S. PATENT DOCUMENTS

| 3,857,429 | 12/1974 | Edwards | 152/379 |
| 3,910,336 | 10/1975 | Boileau | 152/379.1 |
| 3,915,215 | 10/1975 | Nebout | 152/379 |
| 4,148,348 | 4/1979 | French | 152/362 R |

FOREIGN PATENT DOCUMENTS

| 2314632 | 3/1973 | Fed. Rep. of Germany | 152/379.1 |
| 2154790 | 5/1973 | France . | |

*Primary Examiner*—H. Grant Skaggs
*Attorney, Agent, or Firm*—Stevens, Davis, Miller & Mosher

[57] ABSTRACT

A tire and wheel rim assembly wherein the wheel rim includes adjacent to at least one bead seat a circumferentially extending groove and the tire bead has a radially and axially projecting extended toe portion which is axially and radially located within said groove. The toe is flexible in a direction substantially perpendicular to its length and substantially rigid in the direction of its length and provides an effective bead lock to retain the tire bead in position on the rim.

11 Claims, 25 Drawing Figures

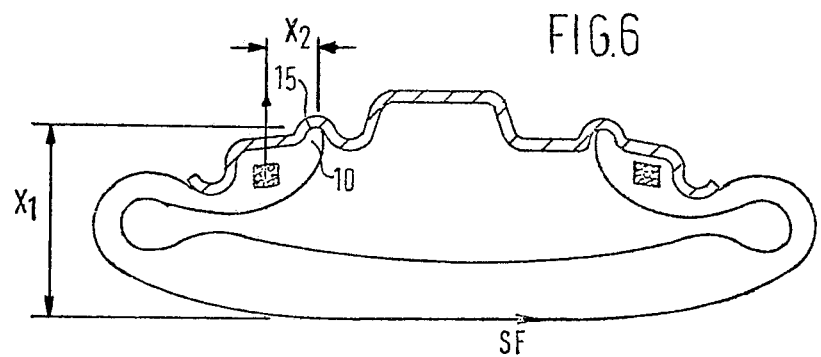
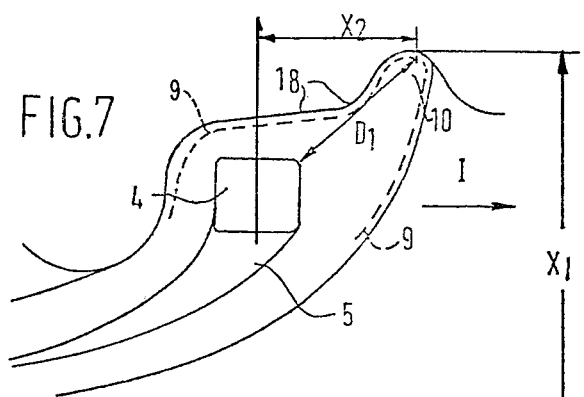
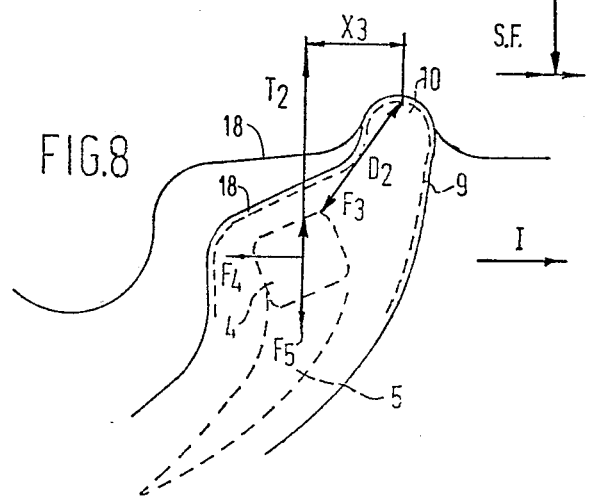

TIRE AND WHEEL RIM ASSEMBLIES

This application is a continuing application of our co-pending application Ser. No. 801,319, filed Dec. 5, 1977, now U.S. Pat. No. 4,148,348.

BACKGROUND OF THE INVENTION

In all tire and wheel rim assemblies safety is of paramount importance. When pneumatic tires are subjected to loss of air pressure the safety of the vehicle is greatly reduced and, with the advent of tires which may be run for substantial distances even when punctured so that the normal required air pressure is not retained, this problem has become the subject of extensive development.

The primary reason for the unsafe condition when the tire is deflated or substantially deflated is tire bead dislodgement from the bead seats when a side force is applied.

In conventional tire and wheel rim assemblies the tire beads are retained on their respective bead seats by means of the internal air pressure and the frictional restraint due to the compression in the elastomer under the bead wire when fitted onto the tapered seat of the wheel rim.

Lowering the air pressure in the tire lessens the retention force from the internal air pressure and eventually at a sufficiently low internal pressure the assembly reaches an unsafe condition in which the tire beads may be displaced from their seats by a sideways force such as is generated in an accident avoidance maneuver or even in the case of steering the vehicle to effect a lane change to find a place where a deflated tire may be removed and a spare fitted.

The U.S. Department of Transportation has standard tests for automobile tires which include FMVSS 110 and FMVSS 109.

FMVSS 110 requires that the tire is retained in position on the rim while the vehicle is stopped in a straight line under controlled braking from a speed of 60 mph at which speed the tire is suddenly completely deflated. FMVSS 109 Section S 5.2 relates to a tire bead unseating test carried out statically by means of applying a point load by an anvil to a point on the mid-sidewall of a tire and increasing the load until unseating occurs.

Neither test applies a dynamic side force condition which occurs in use of a vehicle when a puncture causes deflation of the tire and steering is required.

The European Motor Industry uses a variety of tests to check bead dislodgement. A typical test is carried out by testing a tire and wheel rim assembly as the outer front wheel, i.e., the left-hand or near side, in a right-hand J turn test at 25 mph. The test comprises straight running at 25 mph and then the sudden application of full steering lock. The test is repeated at progressively reducing tire inflation pressures until bead dislodgement occurs. Usually the pressure reduction steps are 2 psi. Typical production radial ply car tires normally dislodge a bead at air pressures of the order of 5-15 psi in such a test.

Nevertheless, dislodgement of a tire bead from its seat when it does occur, may seriously affect vehicle control. In the case of wheel rims which include a well to allow tire fitting there is generally a grave danger of complete separation of the tire from its wheel rim. This action or any contact of the wheel rim with the ground may have serious consequences to the vehicle and occupants.

In the use of a vehicle, cornering generates sideways forces which displace the tread laterally with respect to the wheel rim. These forces are transmitted by the tire to the tire bead. In the region of the tire adjacent to the ground contact area axial forces (i.e., in the direction of the tire axis) and turning moments (i.e., about a circumferential line through the bead) are generated. In the absence of air pressure these forces may be sufficient to produce lifting of the heel of the bead reducing the frictional force between the bead base and the bead seat on the wheel rim which, in said deflated state of the tire, is the only force which retains the bead on its seat. As a result the bead moves down its tapered bead seat laterally inwardly of the rim flange reducing the tension in the bead wire and, very rapidly, the residual bead retaining force becomes less than the dislodging forces and the bead leaves its seat and falls into the well.

Previous attempts to solve this problem have centered around the use of a wheel rim which does not have a well. Such flat-based wheel rims obviate the danger of tire/wheel separation but have the disadvantage that the tire beads, once unseated as above, are usually able to move axially between the two spaced-apart flanges. Thus the sideways force which can therefore be transmitted between the wheel and the ground may change suddenly from zero when the bead is moving across the rim to a maximum when both beads are together against one flange. The change may, in the extreme, cause loss of control of the vehicle.

This is equally true for a well based rim having a filling device, a wheel rim which has a fitting well closed by crimping after tire fitting or a divided wheel rim assembly.

The divided wheel system requires several extra components with consequent disadvantages in sealing the air chamber, increased cost, increased weight and increased complexity for servicing and repair and thus increased danger of incorrect assembly. The well filling system also increases the assembly weight, cost and complicates both fitting and servicing even though basically a one-piece wheel is used. Furthermore when the tire is fitted and inflated there is no way of checking whether correct and therefore safe assembly has been carried out.

None of these systems avoids the problem of side force transmission when a bead moves axially across the wheel rim but proposals to do this are known. For example U.K. Pat. No. 222,768 discloses a bead spacer ring which comprises a rigid, circumferentially extending ring which fits between the tire beads to fill the space between them and prevent their inward movement. Such devices, although basically effective, add yet further components, weight and cost to the assembly. They are complicated and difficult to fit and service.

Another published modification to a divided flat based wheel rim is shown in U.S. Pat. No. 3,857,429 in which the two rim components are divided adjacent to the outboard bead seat and shaped so as to form a notch. A rubber toe is provided on the tire bead which rests freely in said notch. The assembly is still a complex divided rim assembly and uses a flat based rim.

Another system shown in U.K. Pat. No. 890,959 provides a rubber covered fabric reinforced extension of the tire bead which is clamped between the two components of a divided wheel rim. The clamping is used to seal the assembly and while it may retain the bead it would not prevent some bead movement when deflated. The assembly is also subject to the general disadvantages of divided wheel rims.

A one-piece flat based wheel rim has also been proposed in U.K. Pat. No. 1,348,891 in which a well is provided for tire fitting which well is subsequently closed by permanently crimping the wheel rim axially so as to close the fitting well. In such an assembly it is necessary to destroy the wheel rim to remove the tire for service.

Another published system provides a well for tire fitting in the region of one bead seat on an otherwise flat based wheel rim and when the tire has been fitted over the flanges both beads are held against the flange furthest from the well whilst a well filling ring is inserted to provide the second bead seat. Such an assembly is shown in U.S. Pat. No. 3,884,286.

The problems and complexities of the above-mentioned systems are in general unacceptable to the U.S. automobile manufacturers who currently fit tubeless tires on to wheel rims using automatic fitting machines. Usually two operations are carried out. Firstly the tire is placed over the wheel rim and a pair of rollers beginning at a common point press both beads together over the flange to the well of the wheel rim. The rollers then move in opposite directions around the periphery of the rim flange thus simultaneously fitting both beads over the flange. Secondly, the tire/wheel rim assembly is inflated by an 'explosion' fitting operation which almost instantaneously inflates the tire and forces both beads home onto their respective bead seats.

Accordingly many attempts have been made to allow the use of normal well-based wheel rims. The simplest method is to provide in the wheel rim circumferentially extending humps formed adjacent to the bead as shown, for example, in the drawings of U.S. Pat. No. 3,540,510. In order that the tire beads may be fitted to their respective bead seats upon inflation such humps can be 1.7 mm in height relative to the bead seat toe diameter but in any case must be limited in height to prevent tire damage on fitting. The sideways forces generated by the road when the vehicle is steered with the tire deflated greatly exceed the forces generated by the inflation pressure and thus the beads can be moved back over the humps.

One-piece wheels have been modified to provide high humps by means of radially movable stops but such devices again add complexity, cost, weight, and are also difficult to make air-tight. The apertures required produce serious points of weakness in the wheel rim itself.

More recently it has been proposed in U.S. Pat. No. 3,951,192 to provide a bead latch in which an axial extension is formed on the outside of the tire sidewalls which is shaped to engage around the wheel rim flange so as to resist bead movement. However, sideways forces rotate the bead with resulting heel lifting and thus this construction cannot, in our experience, be satisfactory. In addition the hook-like extensions are subject to the likelihood of damage from curbstones and are difficult to fit.

The object of the present invention is to provide a secure bead retention system which overcomes all the aforementioned problems, allows the use of a one-piece wheel rim and which allows for automatic assembly using conventional techniques.

The inventors have investigated the phenomena of the forces involved in dislodging the beads of a tire from a wheel rim when on a vehicle. They have also investigated the forces involved in fitting tires to and removing tires from wheel rims. They have found that the road generated forces involved in tire bead dislodgement are quite different from the forces involved in the removal of a tire from a wheel rim with the wheel tire/rim assembly removed from the vehicle for tire replacement or repair.

Accordingly the inventors utilize the difference between the road/tire generated dislodgement forces and the tire removal forces to provide a bead lock which meets the object.

Definition

In this specification the meanings given to the following terms are as stated here.
"wheel rim"—that portion of a wheel upon which a tire is mounted and supported, i.e., not including the central disc of the wheel.
"divided wheel rim"—a wheel so constructed that its main parts when securely fastened together combine to form a rim having two fixed flanges; such a wheel or wheel rim can be separated into two or more parts to allow tire fitting.
"well"—a region, generally U-shaped of reduced diameter provided in a wheel rim which accommodates the tire bead to allow fitting and stripping of a tire over the wheel rim flange.
"flange"—the radially outwardly extending edge portions of a wheel rim against which the tire beads may be located; the flanges provide lateral support to the tire.
"bead seat"—the annular tapered portion of a wheel rim at each side of the wheel rim and upon which the tire bead is located by inflation of the tire and which seat provides radial support to the tire and transmits forces between the tire tread and the wheel.
"sidewall"—that portion of the tire between the tread and the bead.

BRIEF DESCRIPTION OF THE DRAWINGS

Several embodiments of the present invention will now be described, by way of example only, to show the scope of application of the present invention. The embodiments will each be described in conjunction with diagrammatic drawings which relate to each embodiment as follows:

The first embodiment is a 180/65 SR 340 radial tire and wheel rim assembly. A cross-sectional profile of the assembly is shown in FIG. 1, a detailed half-section of the tire is shown in FIG. 2 and the wheel rim is shown in detailed cross-section in FIG. 5.

Figure 3:
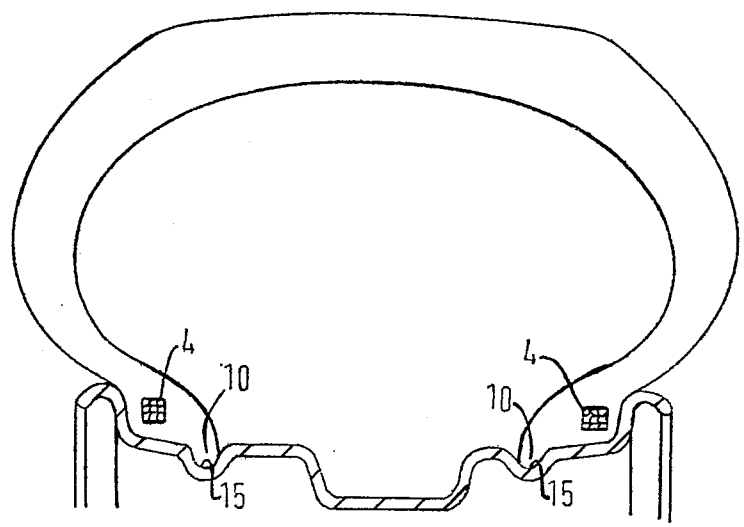
Figure 4:
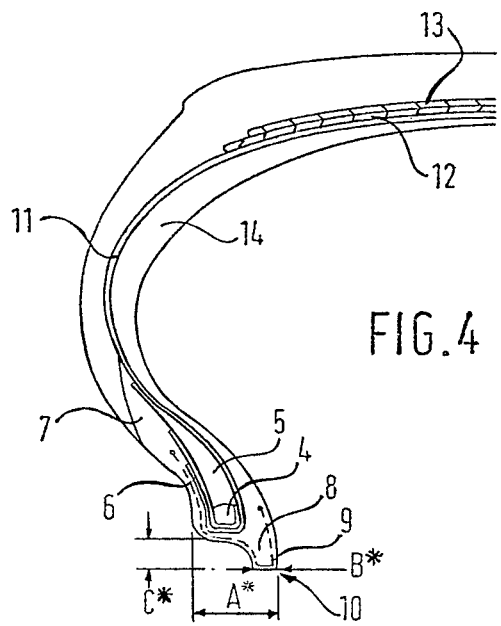
Figure 5:
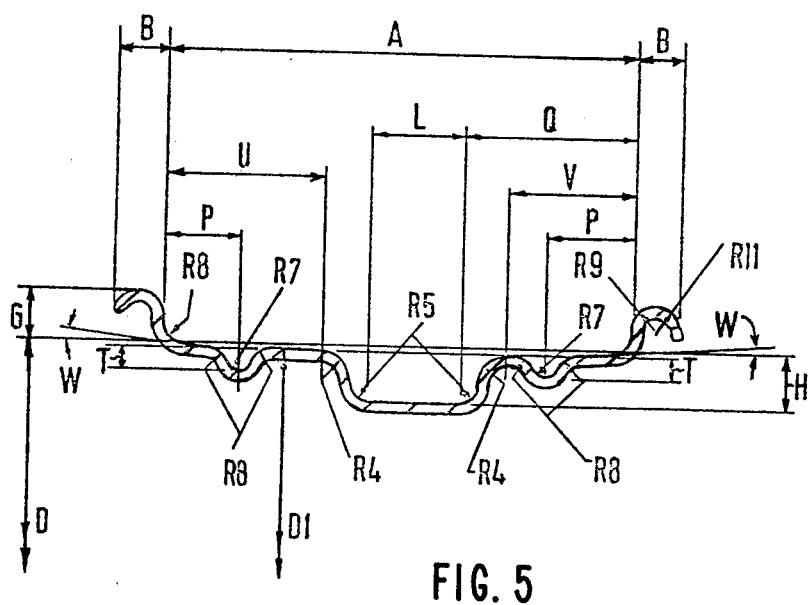

The second embodiment is a 180/65 SR 340 'Denovo' (Registered Trade Mark) run-flat tire of tire/wheel rim assembly and a cross-sectional profile of the assembly is shown in FIG. 3, a detailed half-section of the tire is shown in FIG. 4 and the wheel rim is shown in detailed cross-section in FIG. 5.

FIGS. 6, 7, 8, 9, and 10 are shown to assist in the following description of the operation of the invention based on the current understanding of said invention and show respectively a cross-section of a tire and wheel rim assembly in the ground-contacting area running deflated, an enlarged detail of the bead and wheel rim bead seat area in the condition of FIG. 6, a similar enlarged detail of the bead and wheel rim bead seat area with a side force applied to the tire tread, the tire bead fitting operation and the tire bead removal operation.

Figure 11:
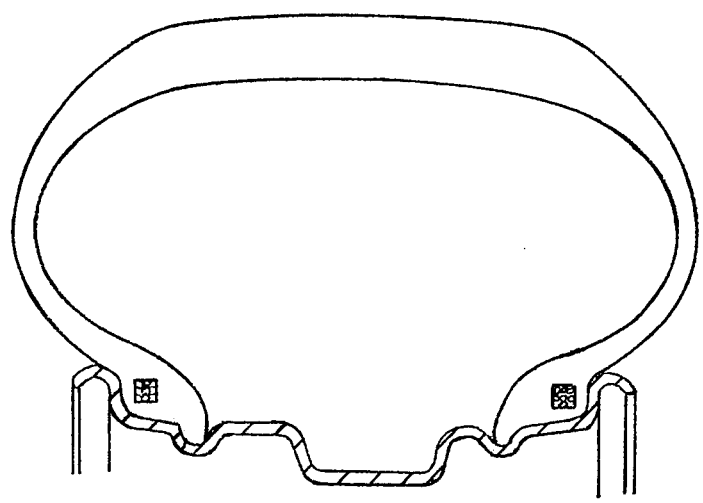
Figure 12:
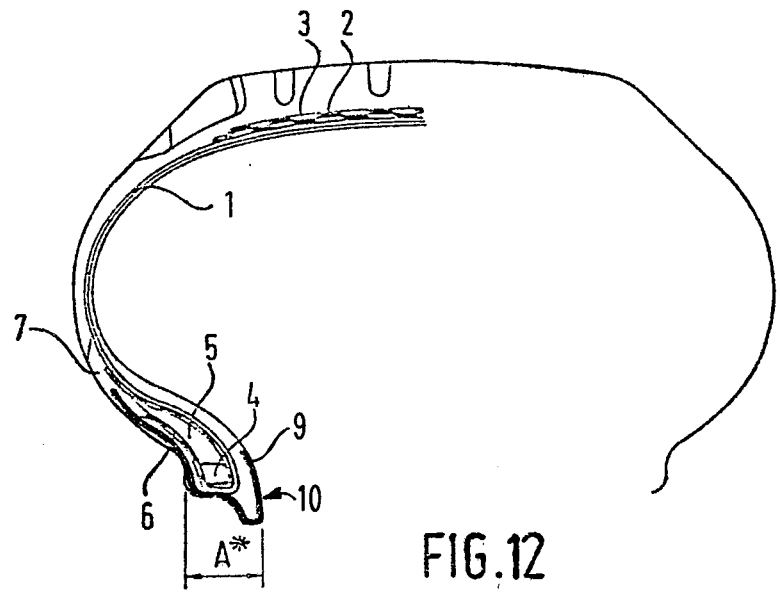
Figure 13:
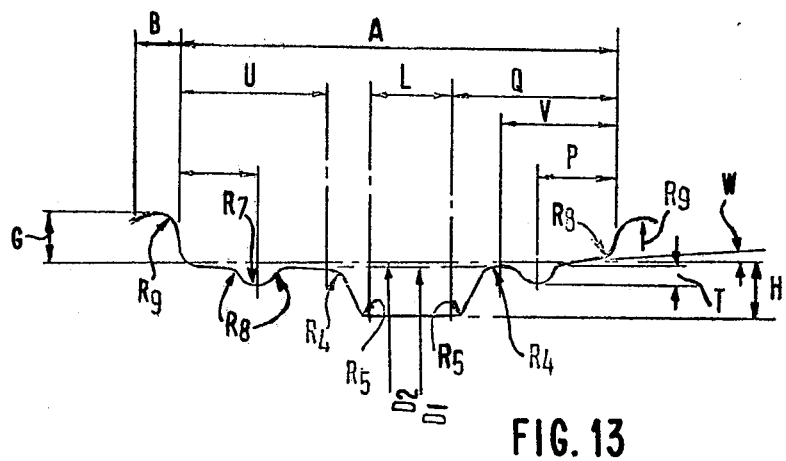

A third embodiment which is a 150/65 SR 320 radial ply tire and wheel rim assembly is shown in cross-sectional profile in FIG. 11, a detailed half-section of the tire is shown in FIG. 12 and the wheel rim dimensions are to be described in relation to the wheel rim in cross-sectional profile of FIG. 13.

Figure 14:
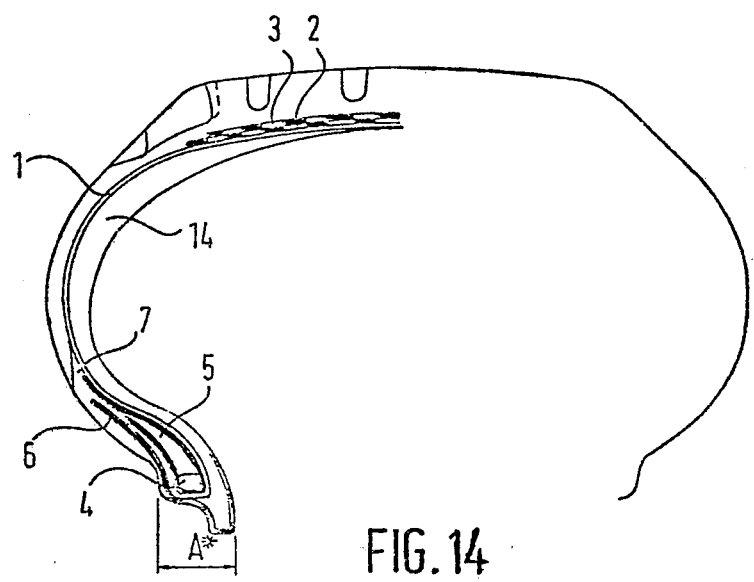

A fourth embodiment is a 150/65 SR 320 'Denovo' (Registered Trade Mark) run-flat type tire and wheel rim assembly. FIG. 14 is a detailed half-section of the tire and the wheel rim profile is again to be described with reference to FIG. 13.

Figure 16:
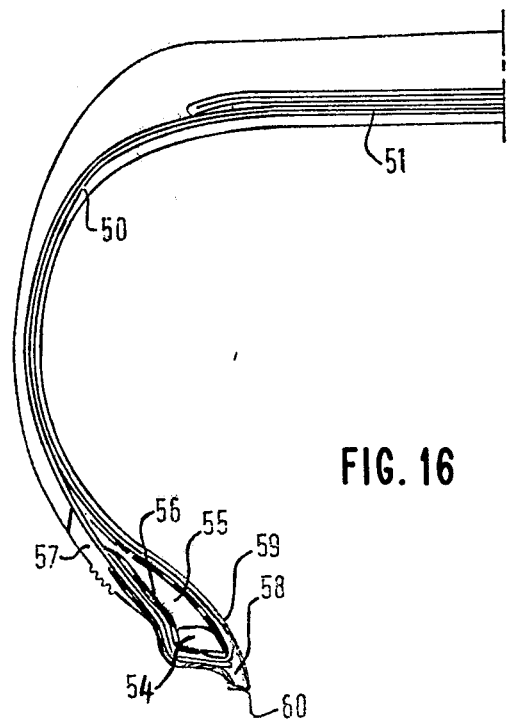
Figure 15:
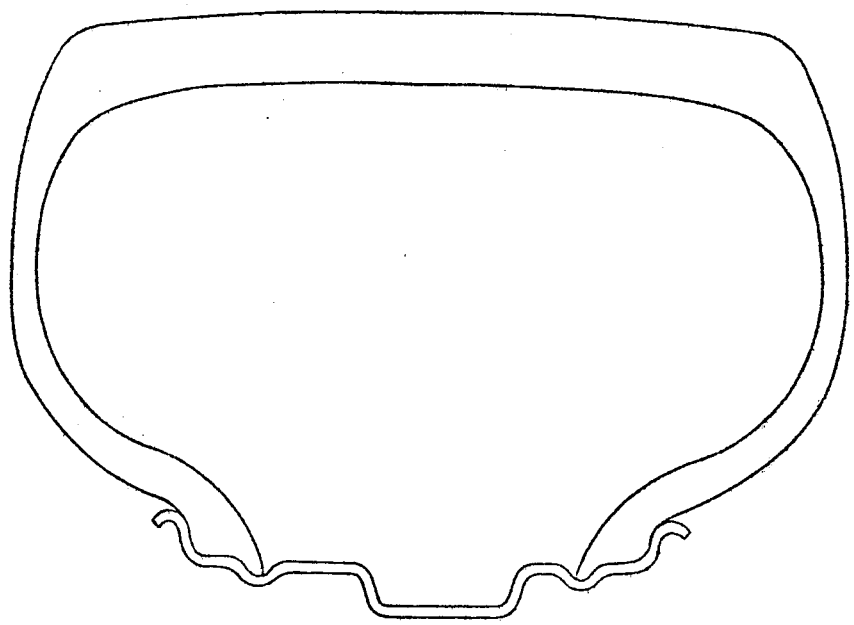

A fifth embodiment is a 240/65 395 radial ply tire/wheel rim assembly the cross-sectional profile of which is shown in FIG. 15, a detailed half-cross-section of the tire is shown in FIG. 16 and the wheel rim is to be described with reference to FIG. 13.

Figure 17:
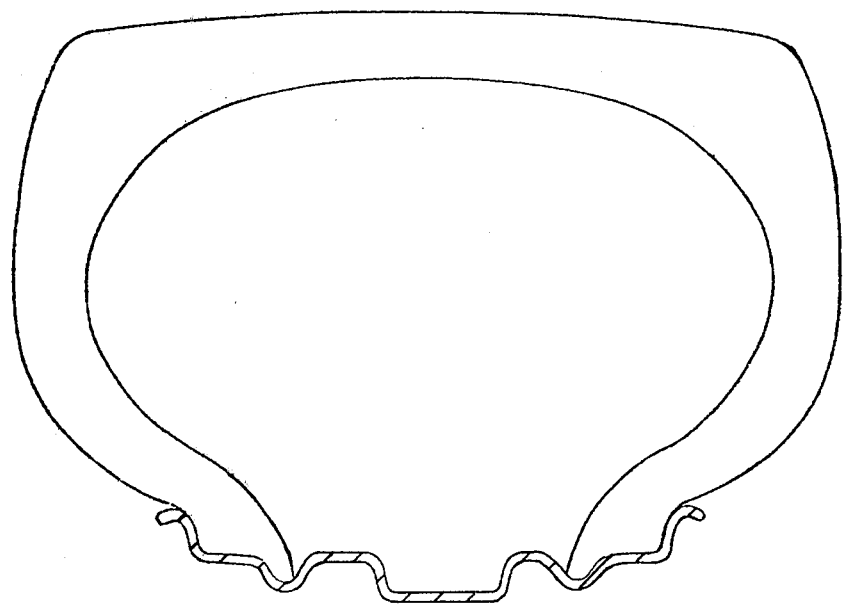

A sixth embodiment is a 240/65 395 'Denovo' (Registered Trade Mark) run-flat type tire and wheel rim assembly shown in cross-sectional profile in FIG. 17. A detailed half-section of the tire is shown in FIG. 18 and again the wheel rim is to be described with reference to FIG. 13.

Figure 19:
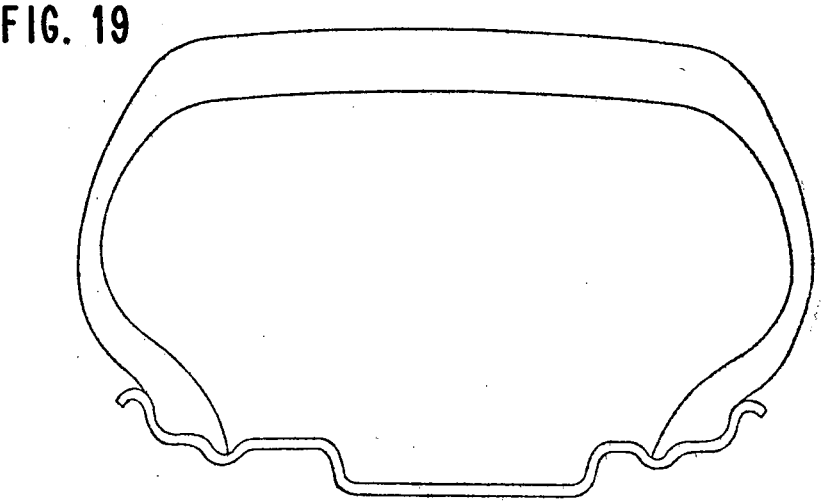
Figure 20:
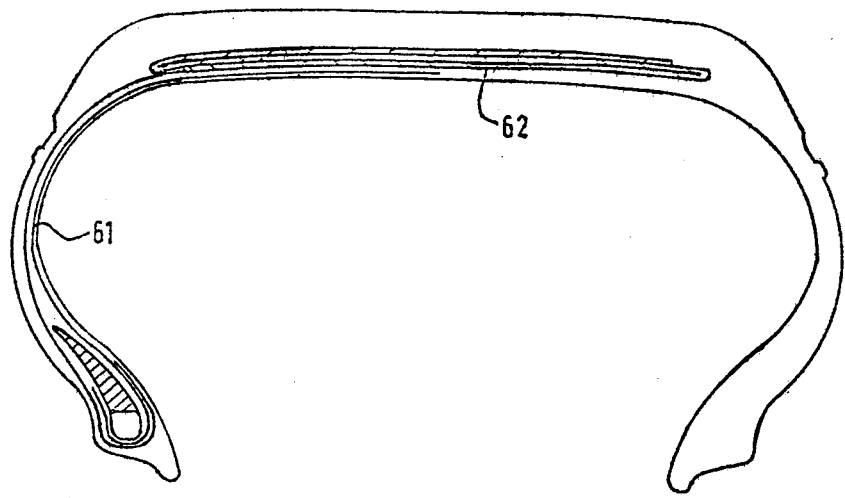

A seventh embodiment, a 200/50-395 radial ply tire and wheel rim assembly, is shown in cross-sectional profile in FIG. 19, a detailed cross-section of the tire is shown in FIG. 20 and the wheel rim is to be described with reference to FIG. 13.

Figure 21:
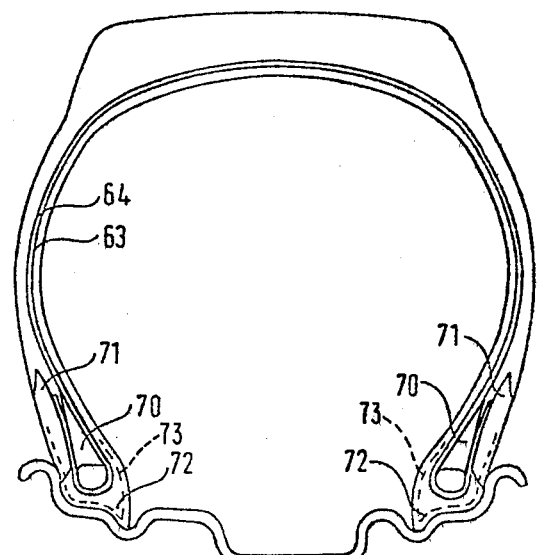

An eighth embodiment is a 560×13 tubeless cross-ply tire/wheel rim assembly shown in cross-section in FIG. 21. The wheel rim of this embodiment is to be described with reference to FIG. 13.

Figure 22:
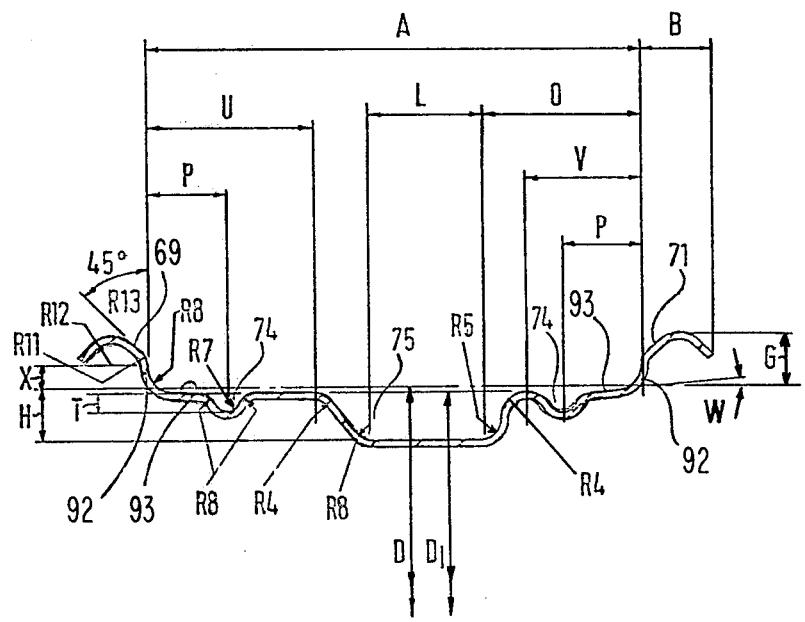

FIG. 22 shows in cross-section an alternative known wheel rim having a substantially straight portion outwardly of the normal flange face and modified according to the present invention.

Figure 23:
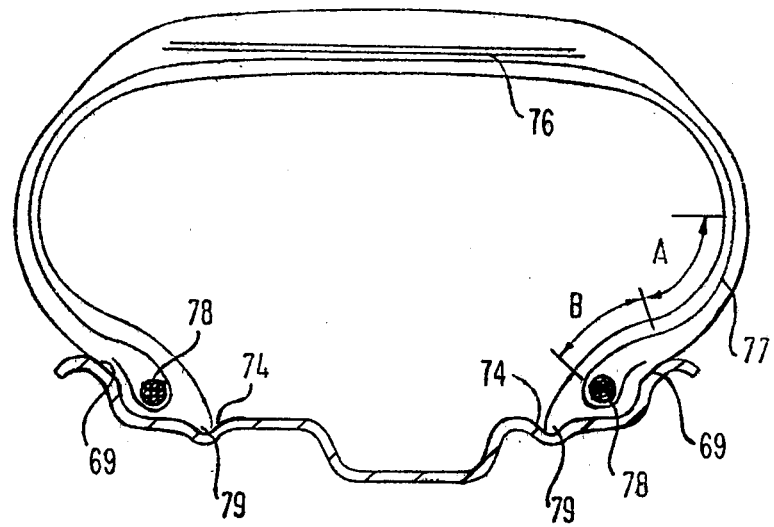

The ninth embodiment is a radial ply tire mounted upon the wheel rim of FIG. 22 and FIG. 23 shows the assembly in cross-section.

Figure 24:
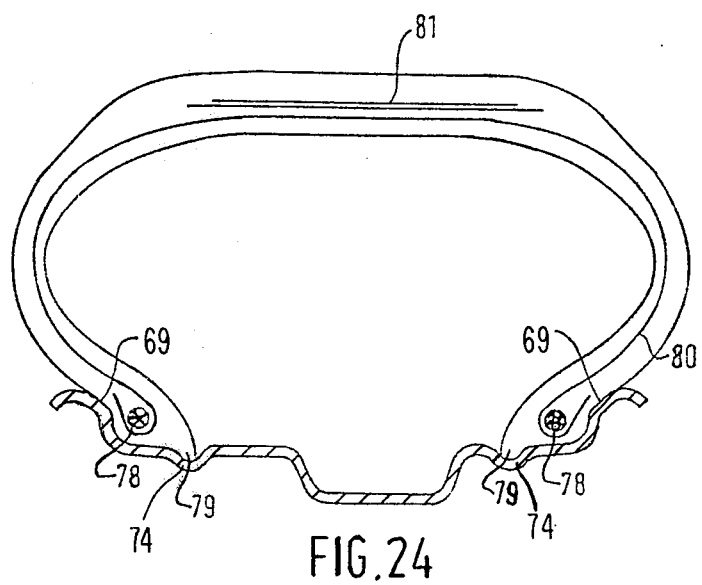

FIG. 24 is a cross-section of a tenth embodiment which is a run-flat 'Denovo' (Registered Trade Mark) tire mounted upon the wheel rim of FIG. 22.

Figure 25:
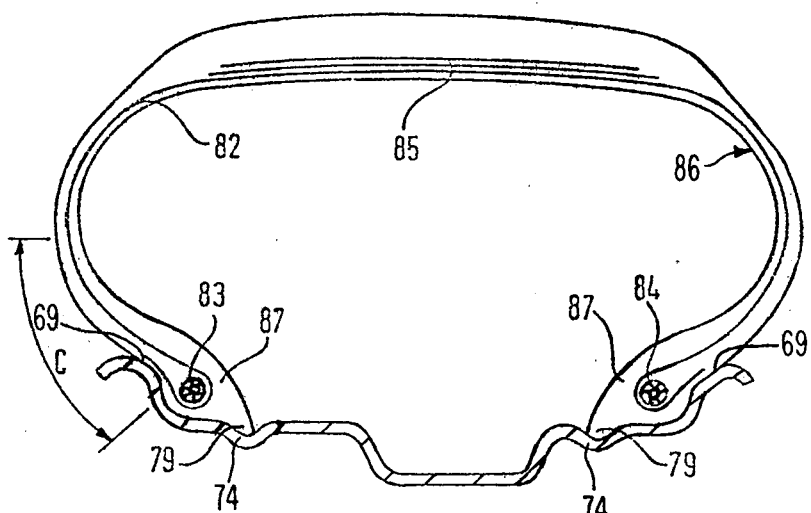

FIG. 25 is a cross-section of a final described embodiment which is an alternative radial ply tire known in the art to that of FIG. 23 having a construction particularly adapted to suit the wheel rim of FIG. 22.

DESCRIPTION OF THE EMBODIMENTS

Figure 1:
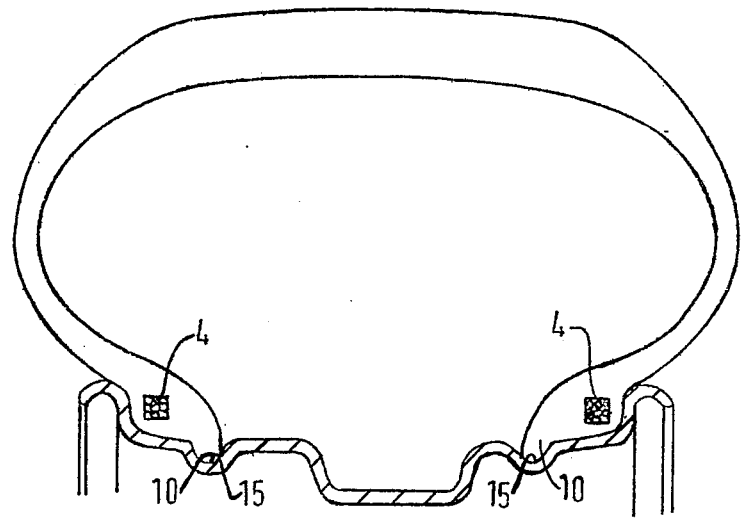

The embodiment of FIG. 1 is a 180/65 SR 340 radial ply tire with a steel breaker and fitted to a 110 mm wide wheel rim having a diameter of 342 mm.

Figure 2:
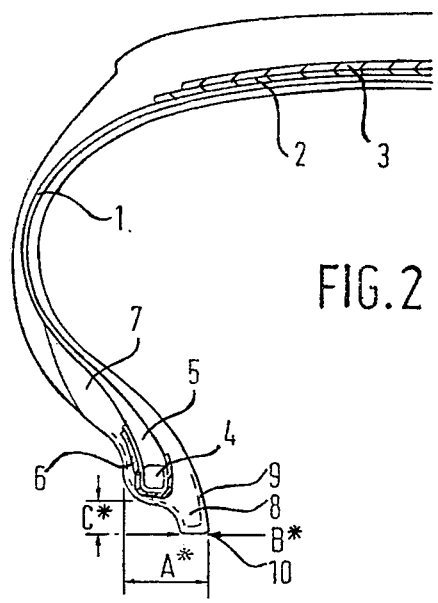

As shown in FIG. 2 the tire has a single radial carcass ply 1 of rayon and a breaker comprising two cut steel plies 2,3 which are at 18° to either side of the mid-circumferential plane of the tire. The first ply 2 has an axial width of 126 mm. Each tire bead wire 4 comprises a 6×6 (strands×turns) of 0.038" diameter steel which is rubber coated. An apex strip 5 is positioned above each bead and has a length of 30 mm and is made from rubber of 80° Shore hardness. A filler ply 6 of rubber coated nylon tire fabric is positioned around the bead wire with the nylon cords at 45° to the radial direction. A clinch strip 7 of rubber material is positioned in the outer part of the bead and extends to a radial height of 42 mm. An additional strip 8 of hard rubber material is positioned radially and axially inwards of the bead wire to form a toe 10. A toe reinforcement strip 9 of cross-woven nylon fabric is positioned with the cords of the fabric at 45° to the radial direction so as to extend from the clinch strip 7 around the outer surface of the bead and the toe 10 as shown in FIG. 2.

The tire is cured using a clip ring shaped to the required toe shape shown in FIG. 2 and the completed tire has an extended toe of hard rubber incorporating a reinforcement strip 9. The toe has an axial length $A^*$ of 20 mm, an end width $B^*$ of 5 mm and a radial length $C^*$ of 6 mm.

The hard rubber material of the toe strip 8 has a nominal hardness of 80° Shore.

The tire and wheel rim assembly shown in FIG. 3 is a 180/65 SR 340 'Denovo' (Registered Trade Mark) tire mounted on a 110 mm wide wheel rim. Such a tire/wheel rim assembly is designed to be able to run deflated for substantial distances.

The tire is shown in more detail in FIG. 4 and comprises a single radial carcass ply 11 of rayon and a breaker of two cut-steel plies 12,13, one at 18° to either side of the mid-circumferential plane of the tire. The inner steel breaker ply has a width of 126 mm. A high resilience rubber composition 14 is used in the shoulder and upper side wall portions of the tire as described in U.S. Pat. No. Re. 29,089.

The tire has a lubricant/sealant material coated on the inner surface of the tire in the region of the tire crown which provides a sealant to reseal a puncture and a lubricant to void internal damage and reduce heat build-up when running flat. Further details of such a coating are given in U.S. Patent Application Ser. No. 766.679. filed Feb. 8, 1977.

The tire lower sidewall and bead is constructed the same as that for Example 1 and in both cases the tires are fitted to a 110 mm wide wheel rim as shown in FIG. 5. The wheel rim is rolled from 0.092" thick steel and the dimensions are as follows:

A: 110 mm
L: 21 mm
Q: 41 mm
V: 29.5 mm
P: 20 mm
U: 37 mm
B: 12 mm
H: 13 mm
$D_1$: 340 mm
G: 12 mm
D: 342 mm
$R_9$: 7 mm rad
$R_4$: 6 mm rad
$R_5$: 4 mm rad
$R_8$: 5 mm rad max
$R_7$: 3 mm rad
T: 5 mm
W: 5°±1°
$R_{11}$: 9 mm rad The above described tire/wheel rim assemblies are suitable for a vehicle having an axle load of 1840 lbs.

FIGS. 6–10 relate to the operation of the bead lock and will be described later.

The tire/wheel rim assembly of FIG. 11 is a smaller tire/wheel rim assembly being a 150/65 SR 320 radial ply tire fitted to a 95 mm wide rim.

The rim dimensions are as follows:

A: 95 mm
B: 12 mm
$D_1$: 318 mm
$D_2$: 320 mm
G: 12 mm
P: 18 mm

H: 13 mm
L: 20 mm
Q: 37.5 mm
T: 5 mm
U: 27 mm
V: 27 mm
$R_4$: 6 mm
$R_5$: 4 mm
$R_7$: 3 mm
$R_8$: 5 mm
$R_9$: 7 mm
W: 5°±1°

The material thickness is 0.092".

The radial ply tire shown in FIG. 12 comprises a single radial carcass ply 1 of rayon and a breaker comprising two cut-steel plies 2,3 which are at 18° to either side of the mid-circumferential plane of the tire. The first ply 2 has an axial width of 96 mm.

The bead core 4 comprises a 5×4 (strands×turns) of 0.038" diameter steel wire rubber coated. An apex strip 5 made from hard rubber compound as above is positioned above the bead core 4 and has a length of 25 mm. A filler ply 6 of rubber coated weftless nylon fabric is positioned over the bead wires with the nylon cords at 45° to the radial direction and a clinch strip 7 of hard rubber is positioned outwardly overlapping the apex strip 5 and extends to a radial height of 36 mm.

An additional strip of 80° Shore hardness rubber compound is used to form the toe 10 and a toe reinforcement strip of cross-woven nylon fabric to the same specification as the first example is positioned to form the outer toe surface. The toe construction is the same as in the first example except that the axial toe length A* in this case is 18 mm whereas in the first example A* was 20 mm.

The tire shown in FIG. 14 is a run-flat 'Denovo' (Registered Trade Mark) type of tire of the same overall 150/65 SR 320 dimensions as the tire in FIG. 11. It is fitted to the same rim as the tire of FIG. 12. The tire differs from the radial tire in that the sidewalls are thickened and include a high resilience rubber compound 14 in the shoulder. A lubricant sealant layer is utilized for run-flat performance. Both these features are the same as for the second embodiment.

The tires of FIGS. 10–14 are suitable for small cars having an axle load of 1280 lbs.

The tire/wheel rim assembly of FIG. 15 is a 240/65–395 radial ply tire fitted to a 395 mm diameter rim. The tire constructional details are shown in FIG. 16 and the rim dimensions, using the same nomenclature as FIG. 13 are as follows:
A: 170 mm
B: 12 mm
$D_1$: 393 mm
$D_2$: 395 mm
G: 13 mm
P: 20 mm
H: 14 mm
L: 21 mm
Q: 47 mm
T: 7 mm
U: 50 mm
V: 33.5 mm
$R_4$: 8 mm
$R_5$: 5 mm
$R_7$: 5 mm
$R_8$: 8 mm
W: 5°±1°

The material thickness is 0.144".

The tire comprises a casing having two radial plies 50 of rayon and two folded edge steel breaker plies 51. The tire beads 54 each comprise a 6×6 (strands×turns) winding of steel wires having a diameter of 0.038" coated with rubber. An apex strip 55 of 80° Shore hardness rubber is provided having a length of 42 mm. A filler ply 56 of rubber coated nylon fabric is positioned around the bead wire and extends to a radial height of 42 mm on the inside of the bead and 28 mm on the outside of the head. The two carcass plies 50 are arranged around the bead assembly in the usual manner and a clinch strip 57 of 80° Shore hardness rubber compound is positioned outwardly of and overlapping the apex strip 55 so as to extend to a radial height of 48 mm.

The toe 60 is formed from a strip 58 of 80° Shore hardness rubber compound and a toe reinforcement strip 59 of cross-woven nylon material as used in the first example is positioned around the outer surface of the toe and bead as shown. The finished tire has the shape shown in FIG. 16 and the axial toe length A* in this case is 20 mm as in the first embodiment.

Figure 18:
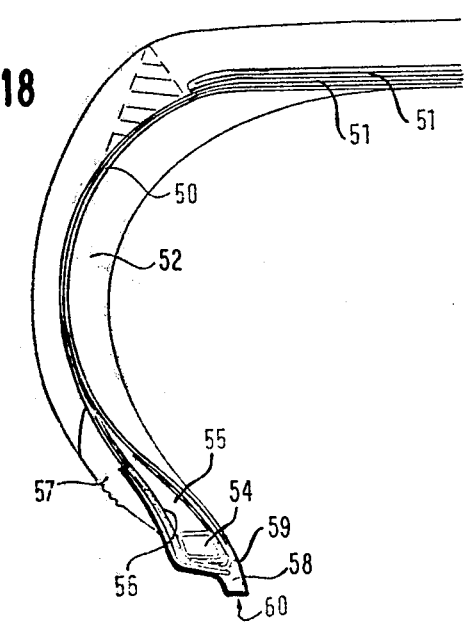

The tire and wheel rim assembly of FIG. 17 is a 240/65–395 'Denovo' (Registered Trade Mark) type tire fitted to a 395 diameter wheel rim. The tire construction is shown in FIG. 18 and its overall dimensions are the same as the tire of FIG. 16. The wheel rim is also the same as that described for the embodiment of FIGS. 15 and 16. The tire structure is basically the same as that of the tire of FIG. 16 except that the sidewalls are thickened by a layer 61 of high resilience rubber. The details of the reinforcement material are the same as for the first example but in this case the material is 15 mm thick from the carcass ply in the tire shoulder, 10 mm thick in the mid-sidewall region and tapers to the carcass under the breaker and at the apex strip as shown. The outer sidewall and clinch strip 57 are also thicker than in the radial tire of FIG. 16 the sidewall rubber being 8 mm thick in the mid-sidewall region.

The tire/wheel rim assemblies of FIGS. 15–18 are suitable for a vehicle having an axle load of 3200 lbs.

The above described examples are all 65 series tires i.e., each have an aspect ratio of 65%. The invention has also been applied to other aspect ratio radial tires and the embodiments of FIGS. 19 and 20 is a 50 series radial ply tire having dimensions of 200/50–395 and which is fitted to a 395 mm diameter wheel rim having the same dimensions as the embodiments of FIGS. 15–18.

The tire has a two-ply rayon carcass 61 and two folded ply steel breakers 62 having a width of 150 mm. The bead area is the same as that of FIGS. 15–18 in relation to construction, dimensions and materials.

The invention has also been applied to a cross-ply tire one example of which, shown in FIG. 21, is a 560/13 tubeless tire which is mounted on the same tire rim section as the third embodiment, i.e., a 110 mm wide wheel rim but with a diameter of 13". The tire carcass comprises two plies 63,64 of rayon.

The beads in cross-section are dimensionally the same as the first embodiment and comprise 6×6 (strands×turns) of 0.038" diameter rubber coated steel wire. An apex strip 70 of 80° Shore hardness rubber material extends to a length of 30 mm and a clinch strip 71 of 80° Shore hardness rubber compound extending to a radial height of 42 mm is positioned in the outer regions of the bead. The bead toe 79 includes a reinforcement strip of cross-woven material exactly the same as the first embodiment.

Another known car tire and wheel rim assembly uses a different rim profile to the above standard radial, cross-ply and 'Denovo' run-flat types of tires. The rim is shown in FIG. 22 and comprises at each edge a portion 69 which is substantially straight when viewed in cross-section as shown, and which provides a flat surface which may contact a tire fitted to the rim. The rim having this feature is modified according to the present invention and thus the remainder of the rim comprises at each side flange 72 connecting the straight portion 69 to a bead seat region 73. Immediately inboard of the bead seat region 73 is formed a groove 74 which extends circumferentially around the rim, one groove 74 being provided at either side of the rim. Between the two grooves 74 is provided a well 75 for tire fitting in the usual manner. Typical rim dimensions are as follows:

A: 125 mm
B: 17.6 mm
U: 42 mm
L: 29 mm
O: 40 mm
V: 29.8 mm
P: 20 mm
G: 13.5 mm
D: 395 mm
$D_1$: 393 mm
T: 5 mm
H: 13 mm
X: 5.7 mm
W: $5° \pm 1°$
$R_5$: 4 mm rad
$R_4$: 6 mm rad
$R_8$: 5 mm rad
$R_7$: 3 mm rad
$R_{11}$: 4 mm rad
$R_{12}$: 7 mm rad
$R_{13}$: 45°

The tire and wheel rim assembly shown in FIG. 23 comprises a radial ply tire having a steel breaker 76 and a textile carcass reinforcement 77 fitted to the rim of FIG. 22. The tire is of the same construction as the first embodiment. The textile carcass reinforcement 77 follows the standard shape from the mid-sidewall region to the bead region, i.e., the initial portion A of the textile carcass reinforcement 77 is convex and the second portion B of the textile carcass reinforcement is concave (both when considered from the outside of the tire). The tire has an outer bead profile to correspond with the wheel rim and in particular to the straight portions 69 so that the tire then matches the wheel rim as shown. Each tire bead includes a bead wire 78 and an extended toe 79 which is formed from hard rubber material (for example 70°–90° Shore). The toe shape is such that the assembled tire and wheel rim is as shown in FIG. 23 and the toe is the same as that described for the first embodiment.

The tire and wheel rim assembly shown in FIG. 24 is a run-flat version of the tire shown in FIG. 23 and comprises a single radial carcass ply 80 of rayon and a breaker 81 of two cut-steel plies. The tire is of the same construction as the second embodiment and the tire beads are constructed as described to provide the required toe 79 to engage the grooves 74 in the rim. Once again the outer profile of the tire in the region of the bead and lower sidewall is molded so that the tire again matches the wheel rim as shown in FIG. 24 as described in the previous embodiment.

The assembly shown in FIG. 25 comprises a tire which has a ratio of height to width less than 1.0, in this case 0.65 and a carcass reinforcement having a neutral fiber that follows, at least between the mid-height of each of the sidewalls and their respective bead wire, the natural equilibrium curve of a single ply carcass having no breaker when such a carcass is subjected to inflation pressure. The curve is tangential to the bead rings, passes through the edges of the breaker and passes through the points in the sidewalls at which tangents drawn to the reinforcement are perpendicular to the tire axis.

The tire comprises a carcass reinforcement ply 82 which is folded around each tire bead wire 83,84 and a breaker structure 85 to reinforce the tread region. The carcass ply 82 in the lower sidewall zone is shaped to remain concave when viewed from outside the tire until it becomes a tangent to the bead wire 83. Thus the reinforcement ply is concave throughout the zone indicated C. Above the lower sidewall zone C the carcass ply 82 follows the neutral equilibrium curve referred to until in the shoulder zone 86 it is blended to curve smoothly to become a tangent to the breaker structure 85 as shown.

The tire carcass ply 82 in the lower sidewall zone C is particularly shaped so as to be substantially parallel to the straight portion of the wheel rim 71. Further details of the tire carcass are published in U.S. Pat. No. 3,910,336.

According to the present invention, however, the lower bead region 87 is shaped the same as in the first embodiment so as to provide a toe 79 which engages the circumferentially extending groove 74 in the wheel rim to provide a bead lock according to the present invention.

As published in U.S. Pat. No. 3,910,336 a property of this type of tire is that the tire characteristics may be modified by changing the rim width for a given tire width. This may be done as long as the flange, bead seat and circumferential groove shapes are maintained as shown without impairing the bead locking.

Operation of the Invention

The operation of the invention will now be described with reference to the first embodiment. The discussion is for the tire section in the ground contact area. The bead toe 10 is longer in the radial direction than the groove depth (6 and 5 mm respectively, see FIGS. 2 and 5) and thus when assembled by the method which will be described later the toe 10 is under a degree of pre-compression between the groove 15 in the wheel rim and the bead wire 4. The tire is retained on the wheel rim by the normal bead wire tension force applied to the bead seat and the tire/wheel rim assembly may be run inflated as normal.

FIG. 6 shows the tire and wheel rim assembly of FIG. 1 in the tire/ground contact area deflated but with no side force applied. In a cornering or turning maneuver a side force SF is developed increasing in intensity as the lateral acceleration increases. This side force distorts the tire sideways relative to the rim and causes the outboard bead to rotate. As a toe is provided according to the present invention, the center of rotation of the bead is the end 10 of the bead toe which is located axially and radially in the groove 15 formed in the wheel rim and thus the moment is $SF \times X_1$ where $X_1$ is the distance measured radially from the tread contact area to the center of rotation.

The tire bead is retained against this rotation by the moment of the bead wire tension about the same center of bead rotation = $T_1 \times X_2$ where $X_2$ = the axial distance of the bead wire from the center of rotation. It should be noted that there is no retention force due to air pressure as the tire is being considered in the deflated condition.

FIG. 7 shows on an enlarged scale the forces applied to the outboard bead seat on the onset of bead rotation. In the condition shown the fitted bead tension $T_1$ which precompresses the rubber in the area under the bead wire is sufficient to retain the bead on its seat by frictional grip, any moment due to the precompression force in the toe then being small.

Increased side force generates an increased moment $SF \times X_1$. This initiates the bead rotation and the bead wire 4 begins to move in the direction I inwardly of the wheel rim. The bead wire 4 is a substantially inextensible hoop around the wheel rim and thus cannot follow the required circular locus to rotate about the center of rotation. Thus the bead wire 4 rotates and moves axially inwards to the position shown in FIG. 8. The complete toe of the tire, which has an effective length $D_1$ in FIG. 7 is therefore compressed to a smaller effective length $D_2$ in FIG. 8 which shows the position when the tire is subjected to a degree of side force. The toe is substantially rigid in the direction of its effective length being made from hard rubber and having a reinforcement ply and being dimensioned to have a substantial compression stiffness or form stiffness along its length. The reaction forces have a resultant force $F_3$ generated by the toe against the bead wire 4 which has an axially outward component $F_4$ and a radially outward component $F_5$. The force $F_5$ greatly increases the tension in the bead wire 4. The latter tension adds to the tension force $T_1$ an additional component $T_2$. Thus the retaining moment $T_1 \times X_2$ is increased to $T_1 X_3 + T_2 X_3$ and rotation of the bead section has occurred about the center of rotation to provide a balanced force condition and no further bead movement.

The above force balance occurs in the ground contact area only where the high side force is in fact applied to the tire by the ground. However, the increased bead wire tension affects the complete hoop of the bead wire 4 and tightens it onto the rim. This increases the grip of the tire bead to the bead seat of the wheel rim. Bead rotation in the ground contact area may be of the order of 90° when considered as the angle of rotation of the normal bead seating portion 18—18 of the bead.

The bead toe between the bead wire 4 and the groove 15 may be given the required form stiffness by various means apart from the construction described. It may for example be made entirely from hard rubber composition or other elastomeric compositions and it has been shown that a toe of the same shape but made of rubber having a hardness of greater than 80° Shore gives a satisfactory bead lock. The composition may include known additives for providing the required properties, for example fibrous reinforcements which may be linearly or randomly orientated.

The toe may have more than one reinforcement ply 9 and/or in addition the reinforcement ply may comprise separate sections of fabric. The fabric may be woven, non-woven or knitted and made from various reinforcement materials known in the art. The fabric of the reinforcement ply 9 is selected for two purposes, firstly to prevent bulging of the toe and thus contributing to the form stiffness when the toe is under lengthwise compression, and secondly to assist fitting as will be described. It should be noted that the toe materials are not under any substantial load except in the side force conditions which occur when steering of the vehicle is effected with the tire deflated or substantially deflated.

The toe end 10 must be radially and axially inwards of the bead coil 4, so that it comes under increasing compression when the bead is subjected to a rotational moment as described. The moment applied by the side force to the outboard bead may be increased in the ground contact area so as to generate the maximum increased compression and the greatest bead wire tension. The moment may be increased by using a stiffer lower sidewall area, for example by a larger apex strip 5 than in conventional tires and such a stiffened apex is used in the examples. By lower sidewall is meant the sidewall between the bead wire and a horizontal line drawn through the widest portion of the tire when inflated to normal inflation pressure and unloaded.

The shape of the end 10 of the toe is not critical although the flat-ended construction shown in the Figures showing tires is conveniently manufactured using a modified clip ring and using the molding diaphragm to form the inner curved toe surface. When assembled to the rim the center of pressure between the toe end and the groove moves around the base of the groove 15 so that the toe does not readily buckle when the bead is rotated by the side force. Thus the preferred groove shape has a radiused base as shown although other shapes may be utilized.

The wheel rim may be rolled by the conventional wheel manufacturing process.

The initial location or grip of the toe end 10 in the groove base 15 before rotation begins may be further improved by means of roughening the groove, e.g. by knurling, although with the above described embodiments this is not necessary.

Figure 9:
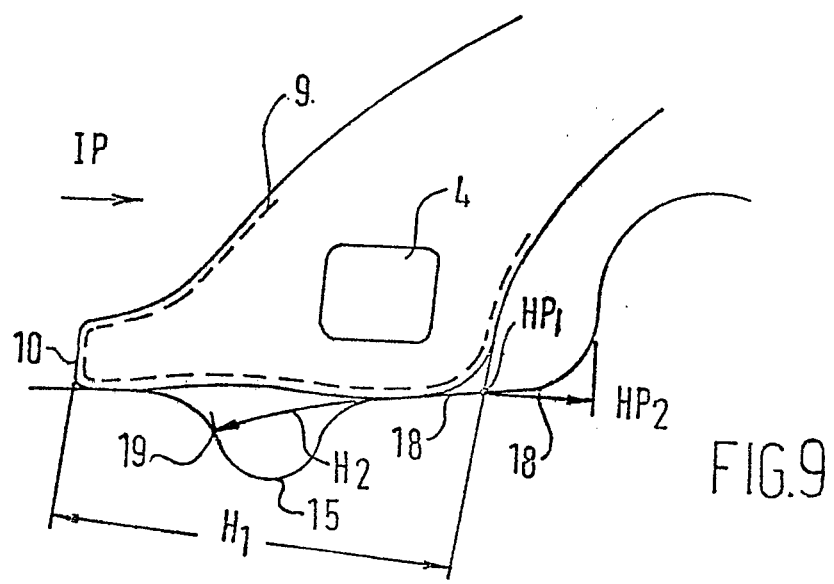

Tire fitting to the rim is conventional. The tire may be fitted over the flanges by hand tools, normal service equipment, or automatic tire fitting machinery. Upon inflation the bead slides onto its seat under the inflation pressure I.P. as shown in FIG. 9. The toe being made of elastomeric material is able to bend to the position shown and when the bead reaches its fully home position on its bead seat 18—18 the toe is able to snap into the groove using the recovery properties of the rubber of the toe in combination with the reinforcement ply 9. When fully inflated the toe positively engages in the groove as shown in FIGS. 1 and 3 so that the toe end 10 is radially and axially located in the groove base 15 and the toe is under a degree of precompression between the groove and the bead wire 4.

To ensure correct fitting the straightened toe length $H_1$ measured from the heel point $H.P._1$ to the toe end 10 must be less than the distance from the heel point $H.P._2$ of the rim along the bead seat 18—18 and to the nearest point on the inboard face 19 of the groove 15, i.e., the length of the line $H_2$.

In the embodiments described to ensure tire fitting the distance measured in the axial direction from the vertical part of the flange to the center line of the groove must be at least the same as the axial distance from the end of the toe to the flange contacting vertical part of the bead before the tire is fitted. These dimensions are both 20 mm in the examples.

Figure 10:
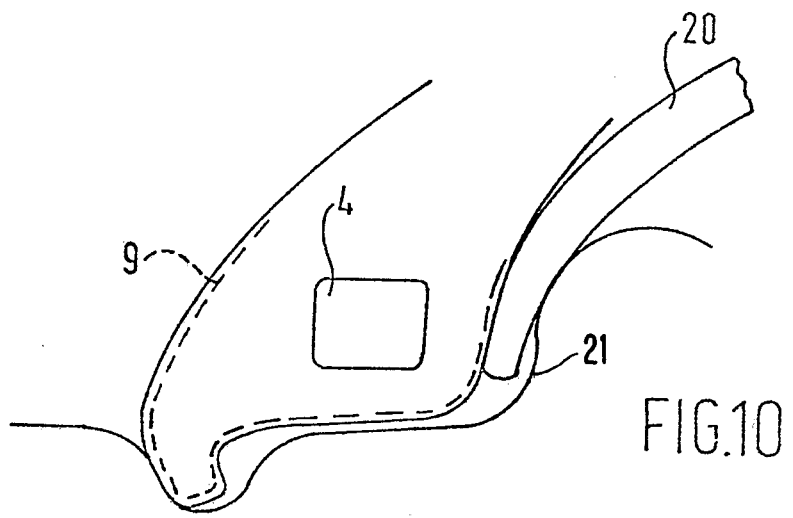

Tire bead removal is shown in FIG. 10. Conventional tire removal tools comprise a spade ended tool 20 which is engaged between the wheel rim flange 21 and is then forced towards the center of the tire/wheel rim assembly in the axial direction. The force does not produce any substantial bead rotation and the tire bead can be successfully dislodged with the toe flexing sideways and without any damage to the tire bead or toe.

The tire/wheel rim assemblies described above in relation to FIGS. 1–5 were tested as the outer front wheel in a J turn test (i.e., straight running followed by a full steering lock application) with the valve core removed. The test was repeated at successively higher speeds on a high grip tarmac surface. Neither of the embodiments dislodged at 40 mph which represents an applied side acceleration of the order of 1 g. Higher speeds do not apply greater side force to the tire since under such conditions the vehicle slides. In Slalom testing at speeds in excess of 70 mph when the direction of the side force changed bead dislodgement did not occur. The assemblies were similarly proved on all other wheel positions.

Accordingly the assemblies were absolutely safe from dislodgement at the maximum side force available even under extreme test conditions.

Even after the above tests the tires were readily removed from the rims using a conventional hand-operated tire demounting machine.

Filmed evidence of the tire behavior on the rim confirmed that the tire bead moves in the ground contact area to lock the tire to the wheel rim in the manner described.

Different rim widths and tyre sizes have been tested successfully using bead locks to the present invention. In the case of different rim widths different material thicknesses may be required for wheel rim strength and to allow convenient rolling the groove dimensions are changed accordingly. The tyre toe dimensions are also changed in proportion and the invention operates precisely as in the detailed case described above.

The invention operates with different tyre section widths, aspect ratios and bead diameters and applies also to all other known tyre constructions tubed or tubeless including radial ply tyres, belted bias tyres, cross-ply tyres and run-flat 'Denovo' (Registered Trade Mark) type tyres.

The bead lock is preferably applied to both tyre beads although it may be applied to only the inboard or outboard bead.

Having now described our invention, what we claim is:

1. A one-piece wheel rim for a tubeless pneumatic tire wherein the radially outer profile of the wheel rim considered in a plane containing the axis of the wheel rim comprises, in sequence, from one edge of the wheel rim profile:
   a radially extending first bead retaining flange having a radially outer edge which is turned axially outwardly;
   a curved seating portion for the heel of a tire bead;
   a substantially straight first main bead seating portion which tapers radially inwardly towards the axially inner regions of the wheel rim;
   means to prevent axial inward movement of the bead of a tire from said first seating portion, that tire having an axially and radially inwardly extending bead toe portion, said means comprising a radially inward extending substantially "U" shaped open bead toe locating groove immediately adjacent to said first bead seating portion, said groove formed by, again in sequence:
   a radially inwardly curving axially outer groove edge portion extending from the axially inner edge of the bead seating portion and smoothly curved with a radius in the range of 5 mm to 8 mm;
   an outwardly concave groove base portion having a radius in the range of 3 mm to 5 mm; and
   a radially inwardly curving axially inner groove edge portion having a radius in the range of 5 mm to 8 mm;
   a substantially straight flat ledge portion;
   a central tire-fitting well portion having a diameter substantially smaller than the main bead seating portion and arranged to allow tire fitting over the tire retaining flange;
   a radially extending second bead retaining flange on the axial opposite edge of the rim having a radially outer edge which is turned axially outwardly;
   a substantially straight second main bead seating portion adjacent said second flange which tapers radially inwardly towards the axially inner region of the wheel rim;
   means to prevent axial inward movement of the bead of a tire from said second seating portion, that tire having an axially and radially inwardly extending toe portion, said means comprising a second open bead toe locating groove immediately adjacent to said second bead seating portion, said groove formed by, again in sequence;
   a radially inwardly curving axially inner groove edge portion having a radius in the range of 5 mm to 8 mm;
   an outwardly concave groove base portion having a radius in the range of 3 mm to 5 mm; and
   a radially inwardly curving axially outer groove edge portion having a radius in the range of 5 mm to 8 mm;
   said locating grooves being shaped so as to form a pocket to snugly receive said extended toe portion in a manner so that the forces tending to dislodge the bead will compress the extended toe into its locating groove and against said abutment surfaces so as to prevent dislodgement of said bead from its seat.

2. A one-piece wheel rim according to claim 1 wherein each open bead toe locating groove considered in cross-section is symmetrically shaped about a center line extending radially with respect to the wheel rim through the point of minimum radius of the open locating groove.

3. A one-piece wheel rim according to claim 2 wherein said radial center line is spaced in an axial direction from the radially extending bead retaining flange by a distance in the range of 18–20 mm.

4. A one-piece wheel rim according to claim 3 wherein the said bead seating portions have a diameter of about 320 mm and the axial distance between the spaced apart bead retaining flanges is about 95 mm.

5. A one-piece wheel rim according to claim 3 wherein the said bead seating portions have a diameter of about 342 mm and the axial distance between the spaced apart bead retaining flanges is about 110 mm.

6. A one-piece wheel rim according to claim 3 wherein the said bead seating portions have a diameter of about 395 mm and the axial distance between the spaced apart bead retaining flanges is about 170 mm.

7. A one-piece wheel rim according to claim 1 wherein the radial height of each bead retaining flange is in the range of 12–13.5 mm and the radial depth of the tire fitting well is in the range of 13–14 mm.

8. A one-piece wheel rim according to claim 1 wherein the radially outer edge of each bead retaining flange is turned axially outwardly with a radius in the range of 7–9 mm.

9. A one-piece wheel rim according to claim 1 where the radially outer edge of each bead retaining flange includes a radially and axially outwardly extending portion which is substantially straight and extends at an angle of 45° to the radial direction.

10. A one piece wheel rim for a pneumatic tire of a motor vehicle, said tire having beads with extended toe portions projecting axially and radially inwardly of each said bead;

said wheel rim comprising in cross-section, a pair of radially outwardly extending flanges and an open well between said flanges of a radial depth at least as great as the radial height of said flanges so that a tire can be mounted on the rim by use of the open well;

a pair of bead seats immediately adjacent the flanges, each tapering slightly toward said well;

means to prevent axial inward movement of the beads of a tire on said bead seats, said means comprising a pair of circumferential bead toe locating grooves in the rim immediately adjacent the inside edge of each bead seat and positioned to receive said toe portion;

an intermediate rim portion between the groove and the well having a diameter approximately equal to that of the tapered bead seat at its outer edge but greater than the diameter of the tapered bead seat at its inner edge, the edges of said grooves presenting surfaces for abutment of the extended bead toe when the tire bead is subject to a force tending to move the bead off its seat, said locating grooves being substantially "U" shaped and smoothly curved from the inside edge of the adjacent bead seat so as to form a pocket to snugly receive said extended toe portion in a manner so that the forces tending to dislodge the bead will compress the extended toe into its locating groove and against said abutment surfaces so as to prevent dislodgement of said bead from its seat.

11. A wheel for a pneumatic tire of a motor vehicle said tire having beads with toe portions which extends axially and radially inwardly, said wheel comprising a one-piece rim which, in cross-section, includes a pair of radially extending flanges and a pair of bead seats immediately adjacent the flanges, said bead seats each tapering slightly toward the center of the wheel with the outer edge of each bead seat being at a first annular plane;

a well between said bead seats extending radially inwardly to a depth from said first annular plane at least as great as the radial height of said flanges above said first annular plane so that a tire can be mounted on the rim by use of the well;

means to prevent axial inward movement of the beads of a tire on said bead seats, said means comprising a pair of circumferential grooves in the rim, said grooves being positioned immediately adjacent the inner edge of each bead seat with one side of each groove being formed as a radially inwardly smoothly curved extension of the respective bead seat, the radius of curve being 5 mm to 8 mm, each groove having a smoothly curved bottom at a radius of 3 mm to 5 mm and being substantially symmetrical about a circumferential plane passing through the center of its bottom;

a rim portion between each groove and the well substantially at the level of said first annular plane, said locating grooves being shaped to snugly receive said extended toe portion in a manner so that the forces tending to dislodge the bead will compress the extended toe into its locating groove and against said abutment surfaces so as to prevent dislodgement of said bead from its seat.

* * * * *